E. F. WEST.
VEHICLE WHEEL.
APPLICATION FILED SEPT. 18, 1916.

1,295,401.

Patented Feb. 25, 1919.
2 SHEETS—SHEET 1.

Witnesses:
W. F. Kilroy
Charles T. Cobb

Inventor:
Edward F. West,
By Hill & Hill
Attys

E. F. WEST.
VEHICLE WHEEL.
APPLICATION FILED SEPT. 18, 1916.
1,295,401.
Patented Feb. 25, 1919.
2 SHEETS—SHEET 2.
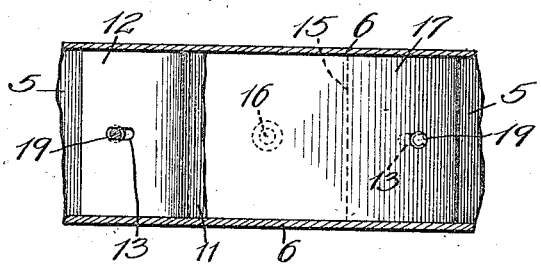
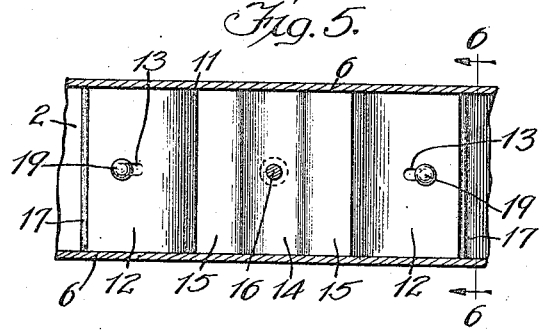
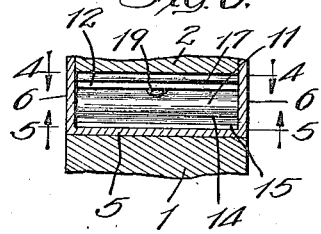
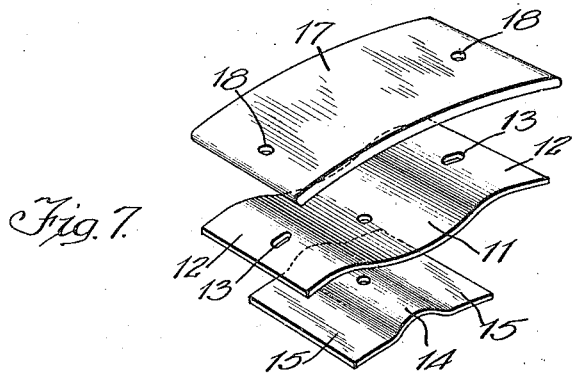
Witnesses:
W. P. Kilroy
Charles J. Cobb
Inventor.
Edward F. West
By [signature]
Attys

UNITED STATES PATENT OFFICE.

EDWARD F. WEST, OF PORT HURON, MICHIGAN, ASSIGNOR OF ONE-HALF TO THOMAS C. HUNTER, OF SPRINGFIELD, MISSOURI.

VEHICLE-WHEEL.

1,295,401.  Specification of Letters Patent.  Patented Feb. 25, 1919.

Application filed September 18, 1916.  Serial No. 120,823.

*To all whom it may concern:*

Be it known that I, EDWARD F. WEST, a citizen of the United States, residing at Port Huron, in the county of St. Clair and State of Michigan, have invented certain new and useful Improvements in Vehicle-Wheels, of which the following is a description.

My invention belongs to that general class of devices known as vehicle wheels and particularly to the class of wheels employed on automobiles, both pleasure vehicles and motor trucks or the like, or on the ordinary horse-drawn wagon or truck. More especially the invention relates to a wheel on which are employed solid rubber tires or the like with the same results, or at least substantially the same results, as when pneumatic tires are employed. The present invention has particularly as an object the production of a wheel in which a solid rubber tire may be employed that will not be subject to puncture or blow-outs and which will have considerably more mileage than the ordinary pneumatic tire casing. It has among its other objects the production of a device of the kind described that is simple, convenient, durable, efficient, compact, attractive and satisfactory, which may be manufactured at comparatively small cost and which will not easily get out of order. Many other objects and advantages of the construction herein described will be obvious to those skilled in the art from the disclosures herein given.

To this end my invention consists in the novel construction, arrangement and combination of parts herein shown and described and more particularly pointed out in the claims.

In the drawings, wherein like reference characters indicate like or corresponding parts, Figure 1 is a side elevation of a wheel equipped with my device;

Fig. 4 is a sectional view taken substantially on line 4—4 of Fig. 6 with a portion broken away;

Fig. 5 is a sectional view taken substantially on line 5—5 of Fig. 6;

Fig. 6 is a sectional view taken substantially on line 6—6 of Fig. 5; and

Fig. 7 is a perspective view of several of the parts disassembled.

Figure 1:
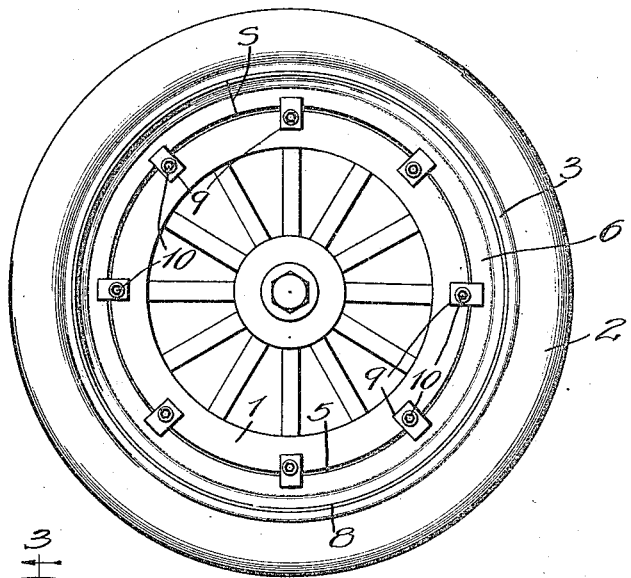
Figure 2:
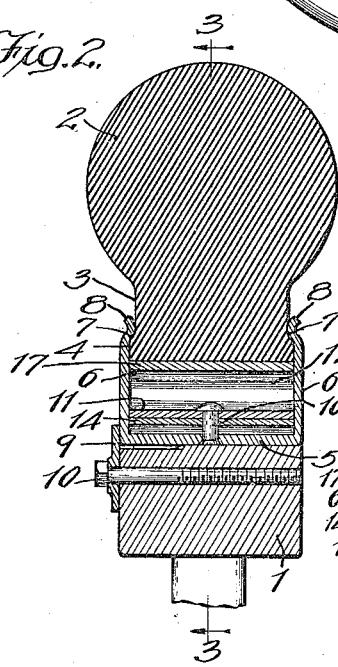
Fig. 2 is a sectional view taken substantially on line 2—2 of Fig. 3.

Referring to the drawings, 1 represents the felly of any suitable type of wheel which may be equipped with any common type of metal rim rigidly secured thereto, if desired (not shown). The wheel is provided with a solid rubber tire 2, which is preferably formed with the neck 3 of reduced width, which is slightly extended as at 4 at the base. By the word "solid" tire I mean any tire that need not be pumped up like the ordinary pneumatic tire, for while a pneumatic or like tire might easily be used on my device, I prefer to avoid the use of the same, thereby obviating trouble from punctures and blowouts.

Figure 3:
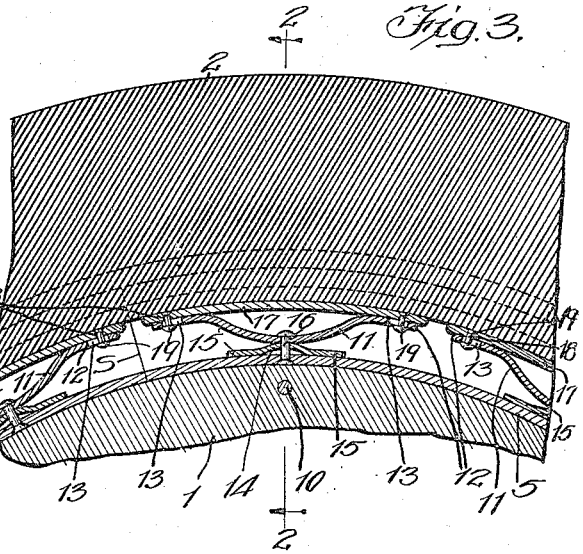
Fig. 3 is a sectional view taken substantially on line 3—3 of Fig. 2.

Mounted on the felly 1 is a rim 5, flanged as at 6—6 at each side, which flanges are preferably slightly offset inwardly at 7 and thence outwardly at 8 at the free edge. I have shown the rim detachably locked in place on the wheel felly by the lock plates 9 and bolts 10. In this connection it may be stated that the rim 5 shown is intended to represent any of the well known demountable rims now on the market, the only difference being that the flanges or side edges 6 are extended outwardly more than the type used for pneumatic tires so as to provide space for my resilient mechanism hereafter described. The type represented is a ring that is split diagonally across, so that it may be contracted slightly to facilitate positioning the tire. In Fig. 3, the break is shown and designated by the reference character S. I do not consider it necessary to describe in detail the method of removing or applying the rim and securing the same in place, as this will be fully understood by those familiar with the art and will vary to some extent depending upon the particular type of demountable rim employed.

Carried by the rim on the exterior face thereof and regularly spaced about the same are a plurality of springs 11, which are secured intermediate their ends to the rim, the outer ends being curved or bent in the preferred construction to conform to the curvature of the rim, or that is extended substantially parallel with the face of the rim 5.

These ends 12, are preferably slotted as at 13, the purpose of the slot being hereafter described. The springs 11 may be secured to the rim 5, in any suitable manner. In the construction shown I have provided an auxiliary spring 14 for each spring 11, the same having the ends 15 arranged to seat on the rim, the two springs being secured to the rim by the rivets 16 or any equivalent means for the purpose. Carried by each spring 11, is a plate 17, which is preferably slightly greater in length than the spring, as most clearly shown in Fig. 3. The plate 17 is also formed or bent to conform to the curvature of the rim, or lie parallel with the same, and is formed with holes 18 therethrough at each end. The same is adjustably secured in place on the springs by the rivets or bolts 19, which are passed through the holes 18 and slots 13.

As before mentioned, the springs 11 and plate 17 are regularly spaced about the rim. The tire 2 is carried by these members, the base of the tire resting upon the plates 17. In the type of rim shown the tire is ordinarily applied to the rim while the same is off the wheel and contracted and the rim then applied to the wheel and locked in place. Any slight shocks will be taken up by the rubber tire or its equivalent, while the greater shocks will be taken up by the springs 11, as well as being taken up by the springs 14 when these springs are employed. Obviously a tire of this kind cannot puncture or blow out. The tire may be constructed so as to reduce skidding if desired, this being immaterial in the present invention. The reduced neck 3 of the tire permits the tire to move in and out as the springs give, while the shoulder 7 engaging with the slight extension 4 at the base substantially locks the tire in place. It has been found that ordinarily when the rim is contracted, little difficulty is met in forcing the tire into place and past the extensions 7. Should the tire and springs be pressed substantially to the limit of their movement, the curved offset 8 will engage with the tire and tend to retard its movement at that time. Obviously the size of the springs, as well as the tire, would depend upon the particular vehicle upon which the device is to be employed, heavy trucks requiring heavier springs and tires than light trucks or pleasure vehicles.

Having thus described my invention, it is obvious that various immaterial modifications may be made in the same without departing from the spirit of my invention, hence I do not wish to be understood as limiting myself to the exact construction, arrangement and combination of parts or uses shown, described or mentioned.

What I claim as new, and desire to secure by Letters Patent is;

1. In a vehicle wheel of the kind described, and in combination, a rim, a series of arched supporting members regularly arranged thereabout and secured to said rim, a series of springs each supported at its center upon the arch of one of said members with the ends of the spring extended outwardly therefrom, and thence formed near the ends to substantially correspond with the contour of the rim, a plate carried by each spring, each of said plates curved to lie concentric with the rim, said plates adjustably secured to said springs at each end thereof by a slot and pin connection, and a tire carried by said plates, said rim extended on each side to embrace the base of the tire.

2. A wheel of the kind described and, in combination, a rim, a series of arched supporting members regularly arranged thereon and secured thereto, a series of arched springs each centrally secured to and supported by one of said arched members, with the ends of the spring extended outwardly therefrom, a plate carried by each spring, each of said plates curved to lie concentric with the rim, said plates and springs being adjustably secured to each other, a tire carried by said plates, said rim extended on each side to embrace the base of the tire.

3. In a device of the kind described an arched member adapted to be secured to the rim of a wheel and a curved spring member adapted to be secured to and centrally supported by said arched member, in combination with a coöperating plate carried by the extended ends of the springs and adjustably secured thereto.

In testimony whereof I have hereunto signed my name in the presence of two subscribing witnesses.

EDWARD F. WEST.

Witnesses:
Roy W. Hill,
Charles I. Cobb.

Copies of this patent may be obtained for five cents each, by addressing the "Commissioner of Patents, Washington, D. C."